Sept. 28, 1965  B. URBAN ETAL  3,208,411
GARBAGE DESTRUCTION PLANT
Filed April 17, 1962
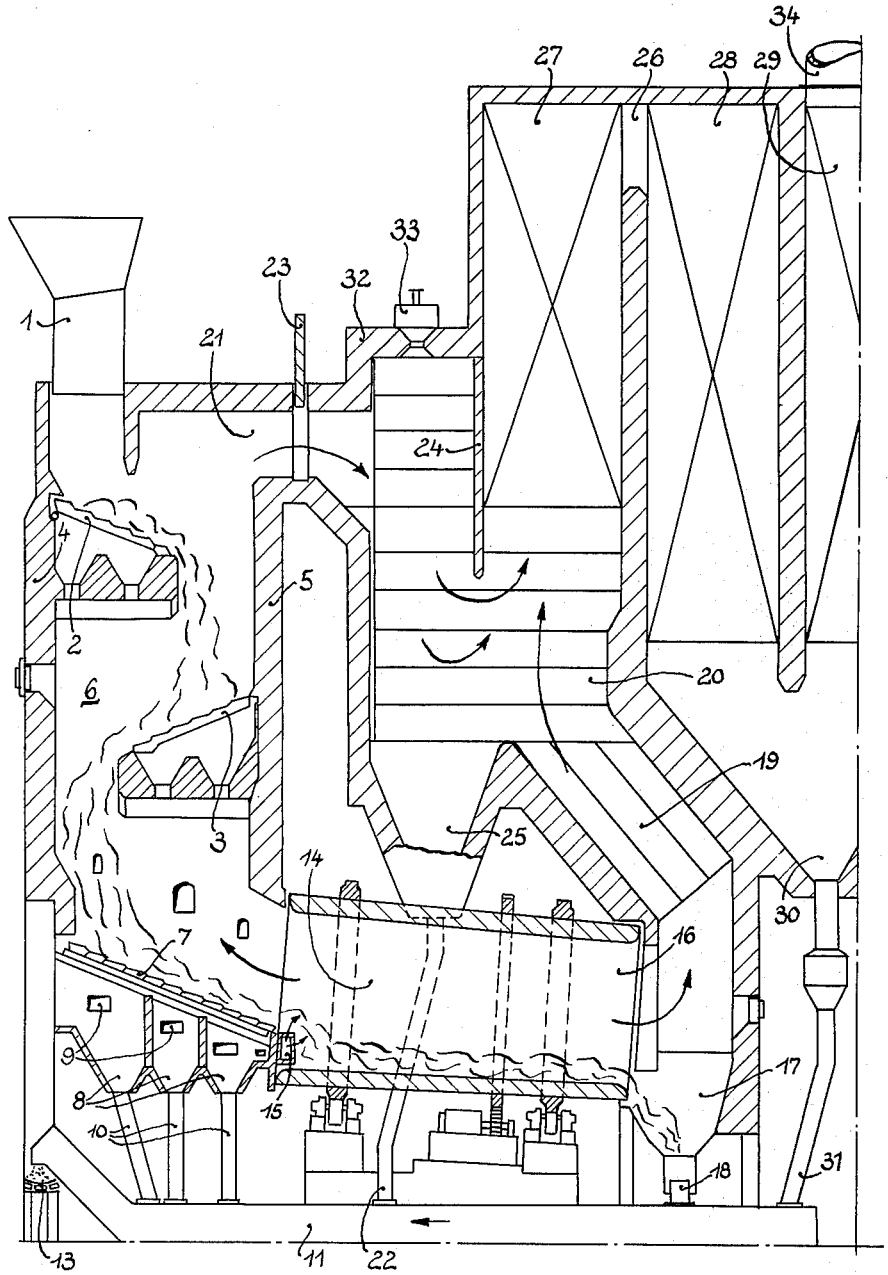
INVENTORS:
Bernhard Urban
Heinz Block
Hans Joachim Müller
BY Michael S. Striker
ATTORNEY.

United States Patent Office 3,208,411
Patented Sept. 28, 1965

3,208,411
GARBAGE DESTRUCTION PLANT
Bernhard Urban, Dusseldorf-Heerdt, and Heinz Block and Hans-Joachim Müller, Neuss, Germany (all of 360 Lexington Ave., New York, N.Y.)
Filed Apr. 17, 1962, Ser. No. 188,160
Claims priority, application Germany, June 24, 1961, W 30,232
5 Claims. (Cl. 110—10)

The invention relates to a garbage destruction plant comprising a drying grate and a burning grate, each such grate being an inclined grate, an after-burning device and a mixing chamber in which waste gases from the residue delivery end of the after-burning device are mixed with waste gases from the drying grate.

Garbage, which contains a wide variety of waste matter, has high moisture contents. Consequently, to burn garbage using only the combustible constituents thereof and no external fuels, nearly all the moisture must be removed from the garbage. Predrying of the garbage in a special combustion furnace is expensive, and so the procedure adopted is to predry garbage introduced into a combustion furnace by means of the hot waste gases envolved in combustion.

In one known garbage destruction plant this predrying is performed by some of the hot waste gases of the combustion grate passing through the drying grate and a bypass channel to a mixing chamber preceding a heat recovery system, the remainder of the hot waste gases flowing to such chamber directly, the mixture passing directly from the mixing chamber to the heat recovery system. The cool wet drying gases are disinfected in the mixing chamber by reacting and are deodorised.

The long bypass pipe required for the wet waste gases from the drying grate makes construction complicated and expensive and has the further disadvantage that deposits of dust form in the bypass pipe which are difficult to remove and that heat and load losses are incurred, so that extra heat must be provided to ensure satisfactory disinfection. A suction blower must also be provided in the pipe since the suction of the heat recovery system is inadequate.

According to the invention, the drying grate is disposed above the combustion chamber but offset therefrom and immediately adjacent the mixing chamber and the heat recovery system immediately following the same, the space above the drying grate being connected to the mixing chamber only by way of a single passage in the separating wall. Consequently, the hot waste gases which are sucked into the mixing chamber through the communicating passage are bound to contact the garbage which is supplied to the drying grate from a filling shaft. The moisture-laden waste gases are mixed with the hot waste gases which rise from the delivery end of the after-burning device and pass through a heat recovery system into the chimney. Since the waste gases which are sucked through the communicating passage at the top end of the drying grate pass to the mixing chamber directly—i.e., need to overcome only a low resistance—an adequate quantity of waste gases is conveyed through the drying grate without any need to provide a long bypass passage and without a suction blower, so that power drying is provided of the garbage on the drying grate. The quantity of waste gas which has to be moved through the drying grate can be controlled by a control member disposed in the communicating passage.

The vapour-like waste gases from the drying grate are mixed without cooling with the waste gases from the after-burning device before entering the heat recovery system. A relatively high temperature is therefore maintained in the mixing chamber, so that the vapour-like waste gases of the drying zone are completely reacted and the waste gases are in a disinfected condition and are free from unpleasant smells. The dried and partly burned garbage then passes to the following burning grate and to the after-burning device. Another considerable advantage of the garbage destruction plant according to the invention is that the waste gases which are removed through the drying grate and which entrain solids when bulky readily combustible material, more particularly paper or the like, is burned, flow down in the mixing chamber so that the entrained solids drop into the ash gallery connected to the bottom of the plant before entering the heat recovery system.

According to another feature of the invention, the after-burning device, mixing chamber and heat recovery system are disposed one above another in a substantially vertical plane, and the combustion zone and drying zone are disposed in a substantially vertical plane adjacent the first-mentioned vertical plane.

Since the after-burning device is, as it were, built into the heat recovery system, the space required by the complete garbage destruction plant is reduced considerably as compared with the known systems, with a resultant reduction in first costs for refractory materials, housing and iron construction. The saving over conventional plant is in the region of from about 25 to 30%. Notwithstanding this smaller construction, for a given heat transfer surface in the heat recovery system the mixing chamber is larger, so that the vapour-like waste gases have definitely completed their reaction before yielding their heat to the heat recovery system. The temperature in the mixing chamber can be increased, if this is necessary when dealing with garbage having inadequate combustible constituents, in manner known per se by using a burner to supply heat.

Another advantage of the compact construction of the garbage destruction plant according to the invention is that, according to the invention, the space below the burning grate, the delivery of the after-burning device, the mixing chamber and the heat recovery system are connected through fallers or tunnels to a common ash and dust conveyor of comparatively reduced overall length, and there is no need to provide separate conveyors to remove dust and ash from the various units which make up the garbage destruction plant.

The invention is illustrated by way of example in the drawing which is a vertical longitudinal section through a garbage destruction plant.

Garbage for destruction is supplied through a vertical shaft 1 to an inclined grate 2 whence it drops on to an inclined grate 3 below the grate 2 and offset therefrom. The two grates 2, 3 are disposed in a drying shaft 6 formed by vertical walls 4, 5. Below the grate 3 the shaft 6 is closed by an inclined grate 7 forming the zone in which the garbage predried on the grates 2 and 3 is burned. The predrying grates 2, 3 and the burning grate 7 are forced-feed grates. Below the grate 7 are air supply chambers 8 to which air for combustion is supplied through apertures 9. The air flows through the burning grate 7 and leads to the garbage disposed thereon being burned. Residue which drops through the grate 7 passes through fallers 10 to a conveyor 11 which conveys the residue to a conveyor belt 13.

From the burning grate 7 the residues pass to a rotating drum 14 which forms an after-burning device and in which the residue is thoroughly burned, air being supplied through a passage 15, burning being assisted by the excess of air in the waste gases from the burning grate 7. The completely burned residue passes from the delivery end 16 of the drum 14 to a delivery zone 17, and at a place 18 therein the residue is introduced into the conveyor 11.

From the drum end 16 hot waste gases flow through a chamber 19, the walls of which have heating surfaces receiving some of the heat radiated, to a mixing chamber 20 which is disposed immediately adjacent the drying shaft 6 and which communicates therewith through a top passage or aperture 21. Also supplied to the mixing chamber 20, the walls of which also comprise heating surfaces, are the vapour-like waste gases which are to be removed from the shaft 6 through the passage 21 and which are so reacted by being mixed with the hot waste gases as to be disinfected and deodorised.

The garbage in the shaft 6 is dried by waste gases from the grate 7 and possibly by a proportion of waste gases from the drum 14, such gases rising in the shaft 6 and being subjected to the draught of the chimney or to a suction device. The quantity of waste gases to be removed through the shaft 6 is controlled by a damper 23 disposed in the passage 21.

Upon leaving the passage 21, the vapour-like waste gases abut a vertical wall 24 and mix, with reaction, with the hot waste gases rising through the chamber 19 into the mixing chamber 20. The dust evolved passes through a bottom delivery funnel 25 into a faller 22 connected to the conveyor 11, and a proportion of the dust passes through the chamber 19 to the delivery 17.

From the mixing chamber 20 the waste gases pass to a heat recovery system 26 which comprises U-shaped chambers 27–29 interconnected at top and bottom, vertical heat exchange tubes extending through such chambers. A delivery funnel 30 is provided below the chambers 28, 29, and dust from the funnel 30 passes through a faller 31 to the conveyor 11.

As will be apparent, the mixing chamber 20 is immediately above the drum 14. The heat recovery system 26, which is in the form of a steam boiler plant, communicates by way of the bottom of the chamber 27 with the mixing chamber, so that the complete garbage destruction plant forms a constructional unit on a very small base surface with only a very small built-around space.

Waste gases are removed from the chamber 29 through a pipe 34.

A burner 33 is provided in the roof 32 adjacent the passage 21 to supply any extra heat which may be required.

The after-burning device can comprise, in addition to a rotating drum, a roller grate or a forced-feed grate or a reversed-feed grate.

We claim:

1. Garbage destruction plant comprising an inclined drying grate means, an inclined burning grate disposed below the lower end of said drying grate means to receive dried garbage falling from the drying grate means, an after-burning device disposed to receive residue from said burning grate, a mixing chamber bounded by a wall adjacent to said drying grate means, said mixing chamber being arranged over said after-burning device, a passage through said wall for conducting waste gas from the drying grate means to said mixing chamber, a connection between said mixing chamber and the residue delivery end of said after-burning device for conducting waste gas from the latter to said mixing chamber to mix with waste gas from said drying grate means, and a heat-recovery system connected to said mixing chamber to receive mixed waste gases therefrom, said after-burning device, said mixing chamber and at least a portion of said heat-recovery system being disposed in superposed relationship as a first vertical assembly adjacent to a second vertical assembly comprising said burning grate and a shaft housing said drying grate means.

2. Garbage destruction plant according to claim 1, wherein said drying grate means includes a plurality of superposed drying grates alternately oppositely inclined and disposed in staggered relationship to cause falling drying garbage to traverse each such grate in turn.

3. Garbage destruction plant according to claim 1, including a common dust and ash conveying system, and fallers connecting the underside of said burning grate, the mixing chamber, the heat-recovery system and the after-burning device residue delivery, respectively, to said common dust and ash conveying system.

4. Garbage destruction plant according to claim 3, wherein said after-burning device comprises a rotating drum.

5. A garbage disposal plant comprising, in combination, a vertical shaft having a pair of opposite walls, an inlet opening at the upper end of the shaft for feeding garbage thereinto and a discharge opening at the lower end of one of said walls; at least one grate connected at one end to one of said opposite walls and projecting from said connected end downwardly inclined toward but short of the other of said walls; a second grate extending inclined to the axis of said shaft transversely through the latter below said one grate and having a lower end at said discharge opening; air passage means for feeding combustion air beneath said second grate so that garbage fed through said inlet opening and passing from said one grate to said second grate may be at least partly burned on the latter, whereby the combustion gas rising upwardly in said shaft will dry the garbage on its passage from said inlet opening to said second grate; a rotatable drum forming an after-burning device extending in the region of the bottom of said shaft laterally to one side of said one wall of the latter, said drum having opposite open ends, one communicating with said discharge opening of said shaft; mixing chamber means located above said drum closely adjacent to said one wall of said shaft; first passage means providing communication between said upper end of said shaft and the upper end of said mixing chamber means adjacent thereto for conducting waste gas from said shaft to said mixing chamber means; upwardly extending second passage means providing communication between the other end of said drum and the lower end of said mixing chamber means for conducting waste gas from said drum to said mixing chamber means to mix therein with the waste gas from said shaft; and a heat recovery system arranged at least in part over said mixing chamber means and receiving mixed waste gas therefrom.

References Cited by the Examiner

UNITED STATES PATENTS

| 1,398,718 | 11/21 | Goder | 110—17 |
| 1,690,260 | 11/28 | Walls | 122—2 |
| 2,015,842 | 10/35 | Christensen | 110—15 X |
| 3,046,915 | 7/62 | Ludin | 110—15 |

FOREIGN PATENTS

| 423,273 | 1/35 | Great Britain. |
| 488,160 | 7/38 | Great Britain. |

FREDERICK L. MATTESON, Jr., *Primary Examiner.*

ROBERT A. O'LEARY, JAMES W. WESTHAVER,
*Examiners.*